United States Patent
Franz et al.

(10) Patent No.: US 6,770,845 B1
(45) Date of Patent: Aug. 3, 2004

(54) SUPPORTING STRUCTURE FOR SHEET MATERIAL

(76) Inventors: Nöst Franz, SchieBrain 12, 77652 Offenburg (DE); Döhring Frank, Luisenstr. 4b, 77654 Offenburg (DE); Richard Bohnert, Binzigstr. 12, 77704 Oberkirch (DE); Konrad Straub, Talstr. 56, 77887 Sasbachwalden (DE); Rolf Kiefer, Anselm-Pflüger-Str. 6a, 77694 Kehl-Kork (DE); Karl-Martin Benz, Weissenbach 20, 77797 Ohlsbach (DE); Horst Ambruster, Augustastr. 7, 77654 Offenburg (DE); Stefan Kolb, Von Dürfeldstr. 4, 77656 Offenburg (DE)

( * ) Notice: Subject to any disclaimer, the term of this patent is extended or adjusted under 35 U.S.C. 154(b) by 0 days.

(21) Appl. No.: 10/352,436

(22) Filed: Jan. 29, 2003

(51) Int. Cl.[7] .......................... B23K 26/00; B23K 26/02
(52) U.S. Cl. ................................... 219/121.82
(58) Field of Search .................... 219/121.6, 121.67, 219/121.68, 121.69, 121.7, 121.71, 121.72, 121.82; 269/289 R, 900, 909

(56) References Cited

U.S. PATENT DOCUMENTS 6,095,025 A * 8/2000 Mirabello 6,497,025 B1 * 12/2002 Bohannan et al.

* cited by examiner

*Primary Examiner*—Samuel M. Heinrich
(74) *Attorney, Agent, or Firm*—Shlesinger, Fitzsimmons & Shlesinger

(57) ABSTRACT

This invention refers to a supporting structure (10) for sheet material as sheet metal material (100) cut out by a laser device (200) located above the sheet material and focused on the same, with means of movement between the laser device and the sheet material and/or supporting structure. The supporting structure substantially comprises vertically mounted parallel rows of identical narrow sheet strips (12), each having raised integrated support areas (22) for the sheet material (100) between recessed grooves (20).

Figure 1:
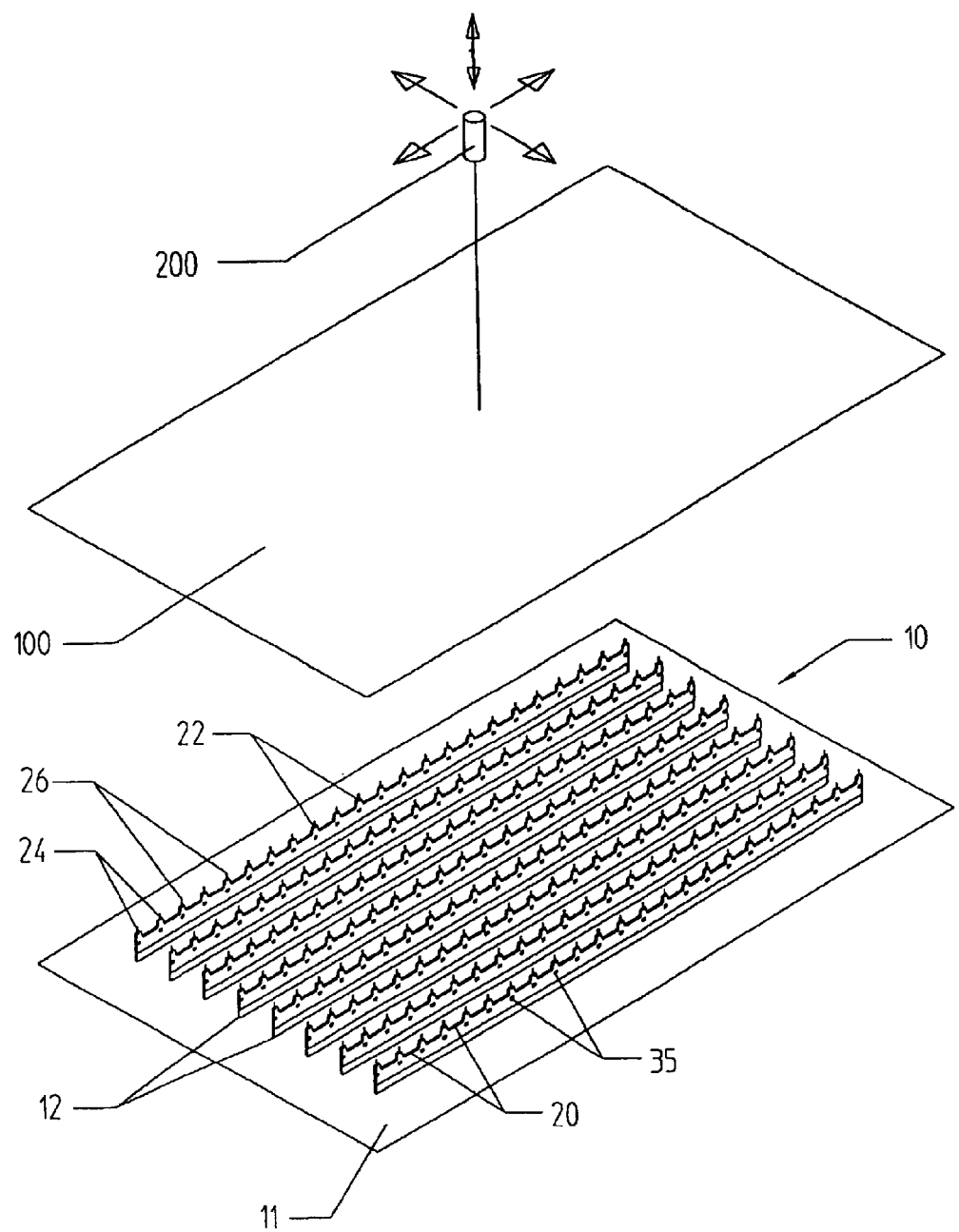

To increase the life time of the sheet strips and therefore the life of the supporting structure, and at the same time to prevent damage to the underside of the sheet material as sheet metal, needles (24) are set onto the integrated support areas (22) of the sheet strips (12), the free ends of which form points of support (26) for the sheet material (100) laid upon them. The needles (24) consist of material that is substantially more heat-resistant than that of the rest of the supporting structure.

17 Claims, 4 Drawing Sheets

SUPPORTING STRUCTURE FOR SHEET MATERIAL

DESCRIPTION

This invention refers to a supporting structure for sheet material, especially sheet metal material cut out by a laser device positioned above the sheet material and focused on it, as defined in the preamble of claim 1.

In this connection, means for movement between the laser device and the sheet metal and/or the supporting structure are provided, permitting the laser device to be guided over the desired cutting positions. The cuts here can be curves or quasi bores formed by round cutouts.

The same problems also exist in other devices in which welding or cutting operations are initiated through the development of heat. These operations affect the underside of the sheet metal, therefore also affecting the supporting structure for the sheet metal.

In one possible version, the laser device is stationary and the sheet metal is moved in two perpendicular directions over corresponding supports in accordance with the desired cutouts. In this case a gap is provided beneath the laser device to prevent damage to the supporting structure or soiling of the underside of the sheet metal. However, moving heavy bodies at the desired high rate of speed results in loss of precision. Therefore, a preferred method is to move the relatively light-weight laser device over a stationary sheet metal support. However, the problem with this in particular is that the laser beam also adversely affects the supporting structure of the sheet metal, so that after a relatively short time a large number of molten metal particles are caused to adhere to it through the action of sparks, etc. The molten sheet metal particles impacting the underside of the sheet metal must be removed in laborious subsequent treatments. Moreover, the supporting structure itself is usually only heat resistant for a short time, which causes instances of melting and a relatively short life. Using highly heat-resistant material is unfeasible due to the costs.

To alleviate the problems described above, the Swiss company Bystronic, for example, has manufactured supporting structures for sheet metal that substantially comprise vertically mounted parallel rows of identical narrow sheet strips having raised integrated support areas for the sheet metal between recessed grooves. Thus, the molten material falling into the recessed grooves causes relatively little damage. Nonetheless, the support areas in particular still constitute a problem zone leading to a reduced lifetime and to contamination of the underside of the sheet metal. Various remedies, such as designing the support areas of the supporting structure for the sheet metal as rollers, have not been fully satisfactory either.

DE 44 46 975 A1 describes a supporting grate for workpieces. This grate, for example, can comprise supporting pins that can be mounted on lower beams arranged side by side. These supporting pins are relatively broad and conical, for which reason the sheet metal runs the risk that sheet material sputtered through the sheet metal by the laser can be reflected from below onto the underside of the sheet metal. If the supporting pins coincide with a laser beam cutting point, they can not withstand the effects of the heat and have a correspondingly short life. The laser machining head can only be moved in a single straight line; a corresponding straight movement of the supporting table in a direction offset by 90° is provided. The cutting itself is performed at one single cutting place. The invention relates in particular to the dropping of sheet metal pieces supported at the most at one or two points, and to their removal of the same. When the last point of the sheet metal part to be cut out is cut through, the sheet metal part tilts down, thus causing a rough cut surface at this end section. This results in diminished quality and requires subsequent treatment.

JP 63-52 790 A, Patent Abstracts of Japan M-723, 1988, vol. 12, no. 269, describes a two-part supporting pin in a support grate, the upper portion of the pin comprising a conical insert of a high-melting material such as molybdenum or tungsten. The wide conical angle and the low cone height cause the material melted and flung downward by the laser device to be reflected back onto the underside of the sheet metal. The lower end of the conical needle tip is a peg which is inserted into the actual hollow-cylindrical needle. The structure is relatively broad and can not be precisely adjusted. The space required for the relatively wide cone base does not allow for very small sheet metal parts down to less than one square centimeter in area to be sturdily supported by three points.

The object of the invention is to provide a supporting structure for sheet metal in accordance with the preamble of claim 1, in such a manner that the lifetime is increased and damage to the underside of the sheet metal is avoided, particularly in the case of a movable laser device over a stationary sheet metal supporting structure.

This object is carried out in accordance with the invention by the features of claim 1. Further embodiments of the invention are protected by the subclaims.

In the subject matter of the invention a needle or similar thin material is mounted on the support areas. The sheet metal is laid onto the free ends of these needles, all of which of course am equal in length. These needles, the mass of which constitutes only a minute proportion, are made of a material such as tungsten that is more heat-resistant than the sheet strips. Of course, they have no eyes as in sewing needles.

The remaining material, namely for the sheet strips, can consist of rustproof steel such as chromium-nickel steel. However, this means that after a rather long operating time, the very hot sheet metal particles heated in the cutting operation, namely the laser cutting wastes, settle on certain parts of the sheet metal supporting structure, namely on the sheet strips, after having been blown out of and catapulted from the kerf of the sheet metal workpiece and striking the sheet strips. More particles can accumulate on this in the course of time; for instance, they can become welded to the supporting structure, so that the raised arrangement of the needle tips over the support areas levels off to such an extent that, contrary to the aim of the invention, waste particles can again contact the underside of the sheet metal, causing the aforementioned damage.

These problems in long-time operation can surprisingly be prevented for the most part by selection of a more suitable material. This material should be substantially different from the material of the sheet metal being processed, which usually can be stainless steel or chromium-nickel steel for the main intended purpose. A material should be selected that does not enter into a chemical and/or physical bond— for instance being fused or welded on, etc.—with the hot sheet metal particles striking it from the laser cutting gap.

Possibly, with regard to the periodic system of elements there can be a certain relationship between the materials selected for the sheet strips of the sheet metal-supporting structure and for the sheet metal being machined. Surprisingly, if a substantially softer material is selected for the sheet metal-supporting structure, one with a substantially lower melting point, a far higher thermal conductivity and as high a specific thermal capacitance as possible, such as copper in the case of chromium-nickel steel, has proved to be particularly advantageous. The chromium-nickel waste particles do not bond with the copper supporting structure, but rather simply drop off.

It must be mentioned in this connection that of course the machining time required by a laser cutting device decreases as the electric power increases, and thicker sheets can be processed more quickly in this manner. However, this also results in a corresponding increase in larger, hot sheet metal particles blown out of the kerf as laser cutting wastes and striking the supporting structure. Thus, the problems explained above grow with increased use of higher-power laser cutting devices and thicker sheet metals to be machined.

The needles mounted on the integrated support areas project upward from the same by approximately one to ten centimeters, preferably two and one-half to three centimeters. This distance is generally sufficient to definitively rule out damage to the sheet strip, not only at the recessed grooves, but also the higher support areas. Moreover, these areas are limited to the minimum surface area required to enable: a secure, defined mounting of the individual needles at a uniform height.

In one embodiment of the invention the following structure is provided:

A strip is fixed to a lower mounting base for attachment to a support bed. The top portion of the strip is bent down by 180°, resulting in two sheet sides. It includes at its top the wide, recessed grooves and the narrow, raised, integrated support areas for the needles. An upper through hole for the needle is provided in the support areas and extends between the two bent down sheet sides. A common, continuous outer guide for all needles is provided in these through holes.

Below the common outer guide there is a common inner guide which also effects an adjustment of the needles, in a direction perpendicular to that of the outer guide. In addition, a common lower stop is provided for all needles to achieve a defined end stop. A broken or faulty needle can be removed and replaced through a lateral orifice located in the two sheet sides, below each needle in the area of the stop.

The needles are in one piece and solid, and their upper ends taper to a point in a conventional manner at the supporting surface. They are extremely thin and so long that no sheet metal material splattered by the laser cutting process can find its way from them back up to the underside of the sheet metal. The diameter of the needles is between one and three millimeters.

The specially designed support areas with recessed grooves between them, and the thin needles make an extremely high needle density possible. This means that even in the case of very small cut-out areas down to one square centimeter and less, a very sturdy three-point support becomes possible. By this means it is possible to avoid the undesirable breaking off of the sheet metal cutout at the last cutting area which causes a rough flawed surface at this point.

The configuration of the support areas, recessed grooves, and needles is preferably such that laterally engaging grippers can lift up the cut-out sheet metal parts and empty them into a container in a conventional or also a specialized manner.

Although the supporting structure is suitable for all sheet metals and for different application purposes, it is preferably utilized in apparatus with a stationary support for the sheet metal and a movable laser device arranged above the same. The laser device in that case is moved horizontally in two perpendicular directions by means of control devices.

THE DRAWING ILLUSTRATES AN EMBODIMENT OF THE INVENTION

Figure 2:
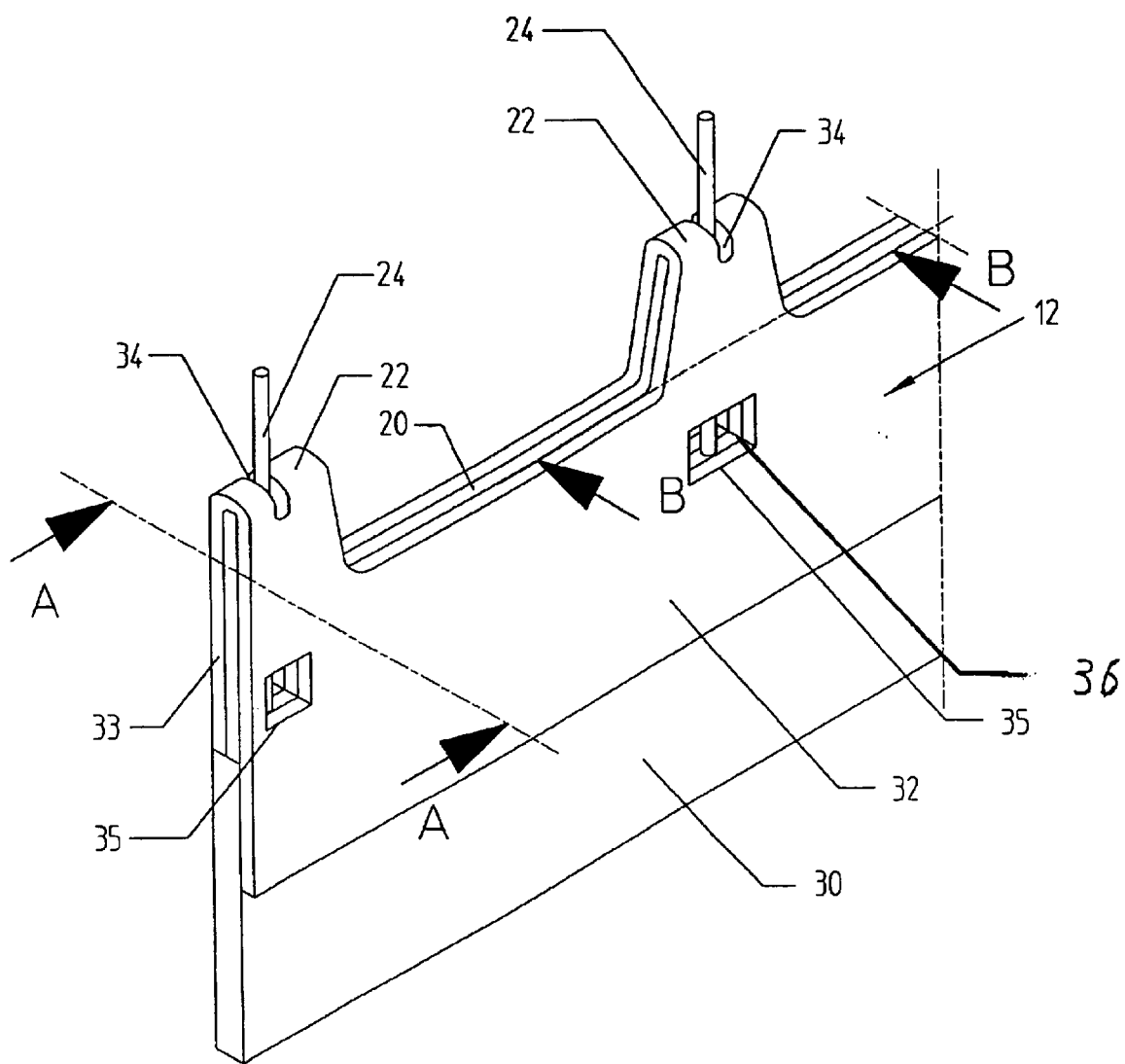
Figure 4:
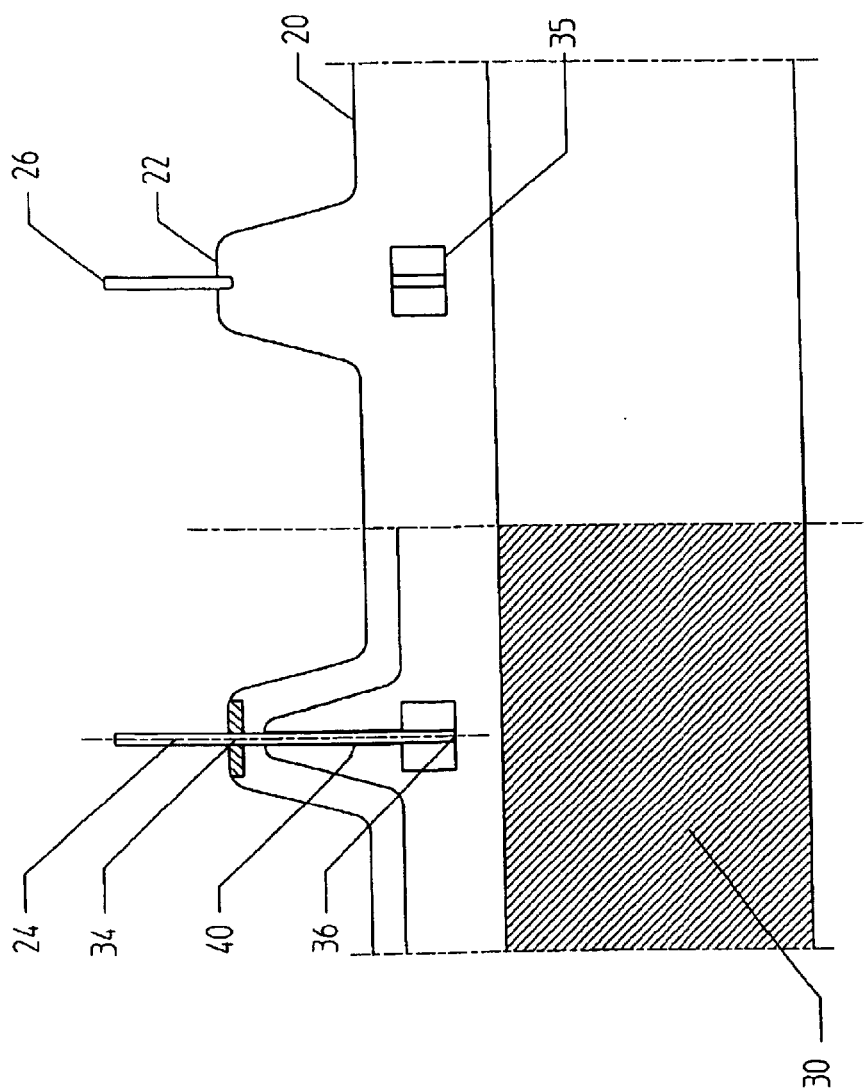
Figure 3:
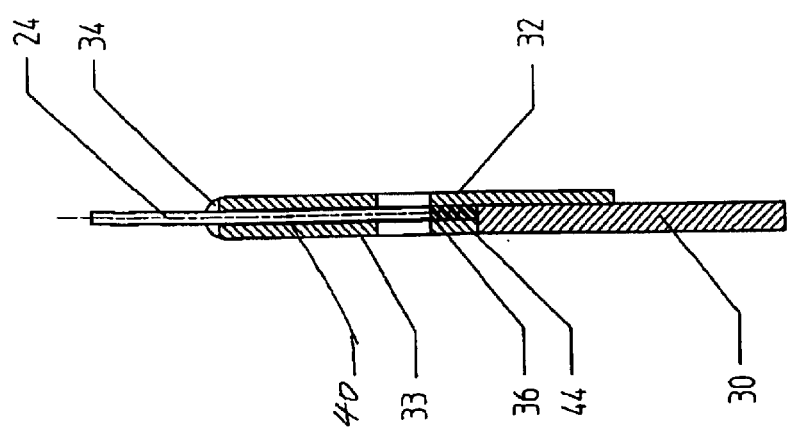
Figure 5:
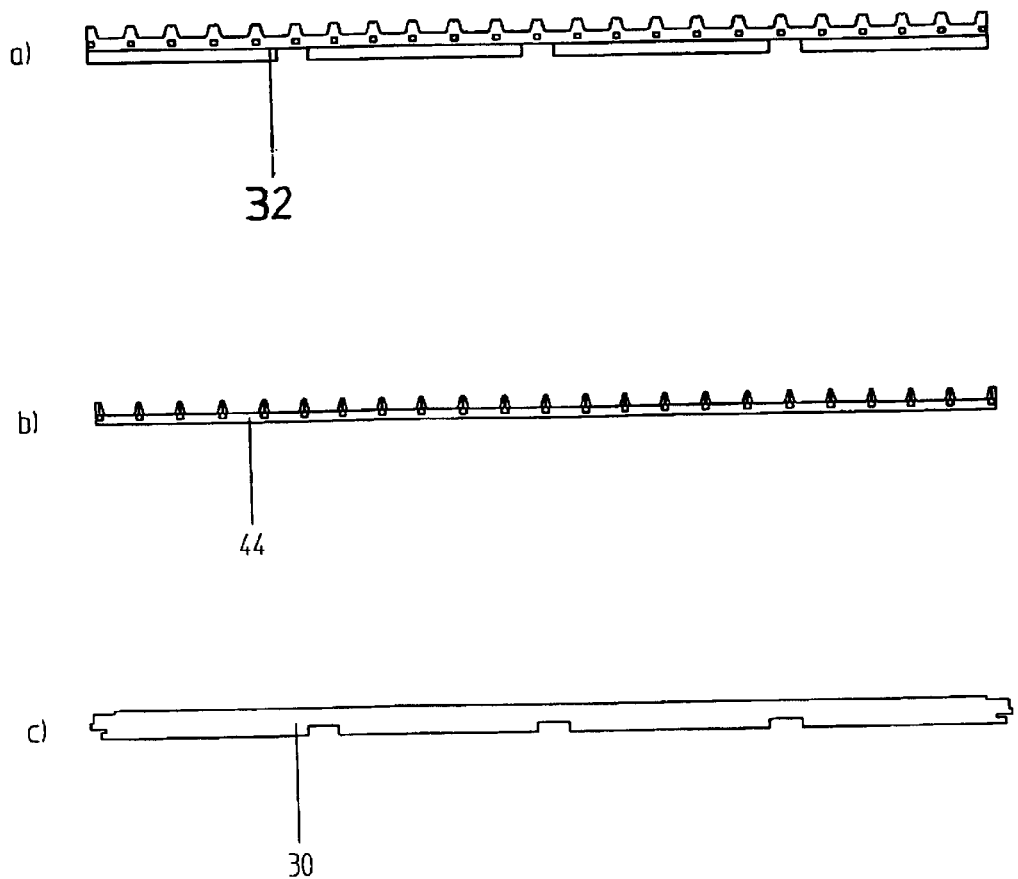

FIG. 1 shows an overall view of a supporting structure comprising a plurality of parallel sheet strips, with the sheet metal being placed onto said supporting structure and the laser device being located above the same, FIG. 2 shows an enlarged perspective view of a single sheet strip, FIG. 3 shows a cross section along line A—A through the sheet strip illustrated in FIG. 2, FIG. 4 shows a longitudinal section along line B—B through the sheet strip illustrated in FIG. 2, FIG. 5 shows the common parts separately, namely the common upper outer retainer, the inner retainer located beneath it, through which the needle passes, and the common lower mounting base for each sheet strip.

In FIG. 1, the number 11 indicates the entire base plate for the individual sheet strips. Individual parallel sheet strips 12 are arranged on the base plate perpendicular to the same. They substantially comprise wide grooves 20, raised narrow support areas 22, and individual thin needles of highly heat-resisting material, preferably tungsten, set onto the support areas and designated with 24. The upper limitation of the needles 24 on which the sheet metal lies is labeled 26. One lateral orifice 35 each for removal of a faulty needle is provided in each of the two sheet strips 12, below each needle 24 and in the area of a common stop for all needles. The sheet metal supporting structure as a whole is designated as 10.

A laser cutting device 200 is schematically represented above a sheet metal 100 being supported. The laser device is optically fixed to the sheet metal and is movable via control devices in the direction of the arrows and vertically to them.

FIG. 2 shows the lower mounting base 30 to which a strip is attached. The strip is bent over by 180° at the top, forming two opposite sheet sides 32, 33. Broken needles 24 can be removed and replaced through a rectangular lateral orifice 35 in these sheet metal sides. This orifice is large in comparison to the needle diameter and is located below each needle 24 in the area of a common stop 38. The wide recessed grooves 20 and the narrow raised support areas 22 lying between the grooves can be seen in the single sheet strip 12. One through hole 34 each for the needle 24 is provided in the support areas 22. A common stop 36 for the individual needles 24 is provided in the lower section of the sheet metal strip 12.

The cross section shown in FIG. 3 along the line A—A— of FIG. 2 depicts the lower mounting base 30; the two lateral sheet sides 32 and 33; the upper hole 34 and the needle 24 inserted into this hole, with the lower end of the needle resting on a common stop 36; and an inner guide 40, 44 for each needle.

In the longitudinal section shown in FIG. 4 along the line B—B of FIG. 2, the same parts bear the same reference numbers. In particular, the upper through hole 34 for each needle can be seen, as well as the inner guide 40 below it, through which the needle is likewise passed down to the lower stop 36 and vertically adjusted. Furthermore, a rectangular removal orifice 35 for a faulty needle is located below each needle 24 in the area of the common stop 36.

In the upper row a) of FIG. 5 a sheet strip 32 is shown from the side. In the middle row b), an inner guide part 44 to be inserted between the two sheet strips 32, 33 is shown. In the lower row c), the lower mounting base 30 of each sheet strip 12 of the supporting structure can be seen. The three strips a), b), c) are combined to form an integrated sheet strip 12 and are equipped with needles.

What is claimed is:

1. A supporting structure (10) for sheet material as for sheet metal material (100) cut out by a laser device (200) located above the sheet metal and focused on the same, with means of movement between the laser device and the sheet material and/or supporting structure, with the supporting structure comprising substantially vertically mounted parallel rows of identical narrow sheet strips (12), each having raised integrated support areas (22) for the sheet material (100) between recessed grooves (20), characterized in that (a) one-piece, solid, thin, pointed needles (24) are set onto the integrated support areas (22), the free upper ends of said needles forming points of support (26) for the sheet material (100) laid upon them, (b) the needles (24) consist of material substantially more heat-resistant than the rest of the supporting structure, (c) each of the thin, heat-resistant needles projects so markedly above the support areas (22) that no damage to the less heat-resistant material of the same and no soiling of the underside of the sheet material (100) is caused by the laser cutting operation, and (d) the lower end of each thin, heat-resistant needle (24) is held in an upper through hole (34) in the raised integrated support areas (22) for the sheet material (100).

2. The supporting structure according to claim 1, characterized in that tungsten is used as the more heat resistant material.

3. The supporting structure according to claim 1, characterized in that the recessed grooves (20) cover a substantial portion of the sheet material in form of sheet metal strips (12), and that the raised integrated support areas (22) are restricted to the area structurally necessary to hold the needles (24).

4. The supporting structure according to claim 3, characterized in that the integrated support areas (22) include a defined mounting for each needle (24) with regard to the upper limitation of the points of support (26) and to vertical alignment in both directions within the sheet strips (12).

5. The supporting structure according to claim 4, characterized by the following structure of each strip:

(a) a lower mounting base (30) for attachment to a support base plate (11), (b) a strip bent over at the top by 180° to form two sheet sides (32, 33) and connected to the lower mounting base (30), (c) said strip having at its top the wide recessed grooves (20) and the narrow raised integrated supported areas (22), (d) with one through hole (34) each being provided in the support areas (22) for a needle (24) guided within a guide means between the two bent-over sheet sides (32, 33), (e) with a second inner guide means (40) for the needles (24) being provided below said guide means in a direction perpendicular to the first guiding direction, (f) with a common stop (36) for the lower end of the needles (24) being provided at the bottom between the two sheet sides (32, 33), (g) such that each needle (24) projects vertically upwards markedly above the support areas (22) to save the more heat-resistant material, and no damage to the less heat-resistant material and thereby resulting soiling of the sheet material as sheet metal (100) occurs, and (h) with one lateral orifice (35) each being provided in the two sheet sides (32, 33) in the area of the stop, for removal and replacement of broken or faulty needles (24).

6. The supporting structure according to claim 5, characterized in that the needles project upwardly by 1 to 8 cm from the support areas (22).

7. The supporting structure according to claim 6, characterized in that the individual needles have a diameter of one to three millimeters.

8. The supporting structure according to claim 7, characterized in that at least three points of support can be provided on an area of one square centimeter for a sturdy three-point support of cutouts correspondingly small in area.

9. The supporting structure according to claim 8, characterized by a configuration an arrangement of the recessed grooves (20), of the integrated raised support areas (22), and of the needles (24) set onto the support areas such that the individual sheet material as sheet metal cutouts lying at the bottom can be lifted up and removed by lateral grips.

10. The use of the supporting structure according to claim 9 in combination with an apparatus having a stationary supporting structure for the sheet material as sheet metal (100) and located above the same a laser device (200) horizontally movable via control devices.

11. The supporting structure according to claim 10, characterized in that stainless steel is used as the material for the sheet strips.

12. The supporting structure according to claim 10, characterized in that a material is used for the sheet strips that does not enter into any chemical and/or physical bond with the hot sheet metal particles striking it that are catapulted from the laser-cut kerf of the sheet metal.

13. The supporting structure according to claim 12, characterized in that the material for the sheet strips is substantially softer and/or has substantially lower melting point than the sheet metal material being machined.

14. The supporting structure according to claim 13, characterized in that the material for the sheet strips has a substantially higher thermal conductivity than the sheet metal material being machined as high a specific thermal capacitance as possible.

15. The supporting structure according to claim 13, characterized in that copper is used as the material for the sheet strips, with stainless steel or chromium-nickel steel being used as the sheet metal material.

16. The supporting structure according to claim 5, characterized in that the needles project upwardly by 2.5 to 3.5 cm from the support areas (22).

17. The supporting structure according to claim 10, characterized in that a material is used for the sheet strips that does not enter into a welded bond with the hot sheet metal particles striking it that are catapulted from the laser-cut kerf of the sheet metal.

* * * * *